(12) United States Patent
Kaneshiro et al.

(10) Patent No.: US 9,248,504 B2
(45) Date of Patent: Feb. 2, 2016

(54) COPPER POWDER FOR CONDUCTIVE PASTE AND METHOD FOR PRODUCING SAME

(75) Inventors: Yuki Kaneshiro, Okayama (JP);
Shinichi Suenaga, Okayama (JP);
Hidefumi Fujita, Okayama (JP);
Minoru Kishida, Okayama (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 246 days.

(21) Appl. No.: 13/814,891

(22) PCT Filed: Sep. 12, 2011

(86) PCT No.: PCT/JP2011/071175
§ 371 (c)(1),
(2), (4) Date: Feb. 7, 2013

(87) PCT Pub. No.: WO2012/043267
PCT Pub. Date: Apr. 5, 2012

(65) Prior Publication Data
US 2013/0177471 A1    Jul. 11, 2013

(30) Foreign Application Priority Data

Sep. 30, 2010 (JP) .................. 2010-220699
Sep. 9, 2011 (JP) .................. 2011-196635

(51) Int. Cl.
*B22F 9/24* (2006.01)
*B22F 1/00* (2006.01)
*C22C 9/00* (2006.01)
*H01B 1/02* (2006.01)
*H01B 1/22* (2006.01)
*C22C 1/04* (2006.01)
*B82Y 30/00* (2011.01)

(52) U.S. Cl.
CPC ............. *B22F 9/24* (2013.01); *B22F 1/0014* (2013.01); *B22F 1/0018* (2013.01); *B82Y 30/00* (2013.01); *C22C 1/0425* (2013.01); *C22C 9/00* (2013.01); *H01B 1/026* (2013.01); *H01B 1/22* (2013.01)

(58) Field of Classification Search
None
See application file for complete search history.

(56) References Cited

U.S. PATENT DOCUMENTS

| | | | | |
|---|---|---|---|---|
| 3,844,799 | A | * 10/1974 | Underkofler et al. | ........ 106/1.26 |
| 3,954,594 | A | * 5/1976 | Recht | .............. 204/263 |
| 6,645,444 | B2 | 11/2003 | Goldstein | |
| 2006/0090596 | A1* | 5/2006 | Goia et al. | ...................... 75/371 |
| 2010/0192728 | A1 | 8/2010 | Haga | |

FOREIGN PATENT DOCUMENTS

| | | |
|---|---|---|
| JP | 63-186803 | 8/1988 |
| JP | 63-186805 | 8/1988 |

(Continued)

*Primary Examiner* — George Wyszomierski
(74) *Attorney, Agent, or Firm* — Bachman & LaPointe, P.C.

(57) ABSTRACT

There are provided a copper powder for conductive paste, which comprises monodisperse and spherical fine copper particles having a sharp particle size distribution and containing no coarse particles and which can form a thinner electrode film while avoiding a bad influence on electric characteristics thereof, and a method for stably producing such a copper powder for conductive paste. After copper is complexed by adding a complexing agent to an aqueous solution containing copper while blowing air into the solution, the blowing of air is stopped, and then, a reducing agent is added to the solution to deposit copper particles by reduction.

6 Claims, 5 Drawing Sheets

(56) References Cited

FOREIGN PATENT DOCUMENTS

| JP | 63-186811 | 8/1988 |
|---|---|---|
| JP | 63-274706 | 11/1988 |
| JP | 1-225705 | 9/1989 |
| JP | 2002-363618 A | 12/2002 |
| JP | 2003-342621 | 12/2003 |
| JP | 2004-256857 | 9/2004 |
| JP | 2005-023395 A | 1/2005 |
| JP | 2005-536634 A | 12/2005 |
| JP | 2008-519156 A | 6/2008 |
| JP | 2010-133015 A | 6/2010 |
| JP | 2010-144197 A | 7/2010 |
| WO | 2009/001710 A1 | 12/2008 |

* cited by examiner

COPPER POWDER FOR CONDUCTIVE PASTE AND METHOD FOR PRODUCING SAME

TECHNICAL FIELD

The present invention relates generally to a copper powder for conductive paste, and a method for producing the same. More specifically, the invention relates to a copper powder for use in conductive pastes for forming internal electrodes of multilayer ceramic electronic parts, such as multilayer ceramic capacitors and multilayer ceramic inductors, and external electrodes of small multilayer ceramic capacitors, multilayer ceramic inductors or the like, and a method for producing the same.

BACKGROUND ART

In a typical method for producing multilayer ceramic capacitors, a plurality of dielectric ceramic green sheets of barium titanate ceramics or the like are prepared, and a conductive paste for internal electrode is printed on each of the sheets so as to have a predetermined pattern. Then, the sheets are stacked and pressed to prepare a laminated product wherein the dielectric ceramic green sheets and the layers of the conductive paste are alternately laminated. The laminated product is cut into a plurality of chips having a predetermined shape. The chips are simultaneously burned at a high temperature to prepare the element assemblies of multilayer ceramic capacitors. Then, a conductive paste for external electrode, which contains a conductive powder, a glass powder and an organic vehicle as principal components, is applied on the end face of each of the element assemblies, which allows the internal electrode to expose, to be dried, and then, burned at a high temperature to prepare an external electrode. Thereafter, a coating of nickel, tin or the like is formed on the external electrode by electroplating or the like if necessary.

As conventional metallic materials for use in such conductive pastes for forming internal electrodes, such as multilayer ceramic capacitors, there have been used palladium, silver-palladium, platinum and so forth. However, these metals are expensive noble metals, so that there is a problem in that the production costs of the conductive pastes are increased. For that reason, in recent years, base metals, such as nickel and copper, are mainly used. At present, there are mainly used fine particles of nickel (fine particles of nickel generally having a mean particle diameter of 0.1 to 0.5 micrometers in accordance with the size and capacity of multilayer ceramic capacitors). Since copper has a higher electrical conductivity and a lower melting point than those of nickel, it can improve the characteristics of multilayer ceramic capacitors, and it can contribute to energy saving for production, such as the reduction of burning temperature, so that it is expected as one of favorable metallic materials for internal electrodes in future.

On the other hand, in recent years, in order to increase the capacity of multilayer ceramic capacitors or the like and to decrease the size thereof, it is desired to decrease the thickness of internal electrodes. It is also desired to provide multilayer ceramic capacitors and so forth which have a low internal inductor and which have can be used up to GHz order as high-frequency characteristics, since the field of application of multilayer ceramic capacitors and so forth is enlarged.

In such background, it is desired to provide fine particles of copper having such characteristics that they are monodisperse fine particles having a sharp particle size distribution and containing no coarse particles.

At present, fine particles of copper are mainly used for conductive pastes for external electrodes of multilayer ceramic capacitors and so forth. Such fine particles of copper have particle diameters of about 0.5 to 10 micrometers in accordance with the size of multilayer ceramic capacitors and so forth, and have various shapes, such as spherical, flaky and undefined shapes. The fine particles of copper having the above-described size and shape are mixed in typical conductive paste for external electrodes to be used.

As methods for producing such fine particles of copper, there are proposed a method for reducing a copper sulfate solution with L-ascorbic acid or L-ascorbate (see, e.g., Japanese Patent Laid-Open No. 63-186803), a method for reducing a copper sulfate solution with D-erythorbic acid or D-erythorbate (see, e.g., Japanese Patent laid-Open No. 63-186805), a method for reducing a copper sulfate solution with a borohydride compound (see, e.g., Japanese Patent Laid-Open No. 63-186811), a method for reducing a copper sulfate solution with an aromatic compound having a hydroxyl (—OH) group (see, e.g., Japanese Patent Laid-Open No. 1-225705), a method for adding a reaction initiator to an aqueous mixed solution containing copper ions, a reducing agent and a complexing agent to allow reduction, and then, for adding copper ions, a reducing agent and a pH adjustor to the solution to produce a fine powder of copper (see, e.g., Japanese Patent Laid-Open No. 63-274706), a method for mixing an alkali hydroxide to an aqueous copper salt solution containing cupric ions to generate cupric oxide, adding a reducing sugar to the solution to reduce cupric oxide to cuprous oxide, and then, adding a reducing agent of hydrazine to the solution to reduce cuprous oxide (see, e.g., Japanese Patent Laid-Open No. 2003-342621), a method for allowing copper oxide to react with a reducing agent, such as hydrazine, in a solvent containing a sulfur compound and a protective colloid to produce fine particles of copper (see, e.g., Japanese Patent Laid-Open No. 2004-256857) and so forth.

However, the fine particles of copper obtained by the method disclosed in Japanese Patent Laid-Open No. 63-186803 have a mean particle diameter of 1.0 to 1.8 micrometers, and are not sufficient to be used as fine particles of copper for internal electrodes. In addition, since the pH-adjusted aqueous copper ion solution and the pH-adjusted aqueous reducing agent solution are used for reducing copper ions to copper particles via cuprous oxide in this method, the control of particle diameters is unstable, and aggregation (bonding of particles) is caused so as not to obtain a constant shape, so that there are some cases where the particle size distribution is broader.

The fine particles of copper obtained by the method disclosed in Japanese Patent Laid-Open No. 63-186805 have a mean particle diameter of 0.8 to 2.0 micrometers, and are not sufficient to be used as fine particles of copper for internal electrodes. In addition, since the pH-adjusted aqueous copper ion solution and the pH-adjusted aqueous reducing agent solution are used for reducing copper ions to copper particles via cuprous oxide in this method, the control of particle diameters is unstable, and aggregation (bonding of particles) is caused so as not to obtain a constant shape, so that there are some cases where the particle size distribution is broader.

The fine particles of copper obtained by the method disclosed in Japanese Patent Laid-Open No. 63-186811 have a mean particle diameter of 0.3 to 0.7 micrometers, which is smaller than that of the fine particles of copper obtained by each of the methods disclosed in Japanese Patent Laid-Open Nos. 63-186803 and 63-186805, but they are not sufficient to be used as fine particles of copper for internal electrodes. In addition, since the borohydride compound is used as a reducing agent, there are some cases where workability and stability are deteriorated by causing autolysis if the pH of the reducing agent is low when the pH is adjusted. On the other hand, if the pH of the reducing agent is raised, the borohydride compound is stabilized. However, since the reduction of copper ions is carried out via cuprous oxide in this case, the control of particle diameters is unstable, and aggregation (bonding of particles) is caused so as not to obtain a constant shape, so that there are some cases where the particle size distribution is broader.

The fine particles of copper obtained by the method disclosed in Japanese Patent Laid-Open No. 1-225705 have a mean particle diameter of 0.7 to 1.5 micrometers, and are not sufficient to be used as fine particles of copper for internal electrodes. In addition, hydroquinone is used as a reducing agent, so that it is difficult to further decrease the size of the fine particles of copper even if the pH and temperature in reaction are controlled. Moreover, since the pH-adjusted aqueous copper ion solution and the pH-adjusted aqueous reducing agent solution are used for reducing copper ions to copper particles via cuprous oxide in this method, the control of particle diameters is unstable, and aggregation (bonding of particles) is caused so as not to obtain a constant shape, so that there are some cases where the particle size distribution is broader.

The fine particles of copper obtained by the method disclosed in Japanese Patent Laid-Open No. 63-274706 have a mean particle diameter of 0.16 to 0.61 micrometers. It is considered that they can be used as a copper powder for internal electrodes judging from the mean particle diameter. However, in this method, the reduction of copper ions is carried out in a high pH range (pH 12-13.5), so that copper ions are reduced to copper particles via copper hydroxide, copper oxide and cuprous oxide. For that reason, the control of particle diameters is unstable, and aggregation (bonding of particles) is caused so as not to obtain a constant shape, so that there are some cases where the particle size distribution is broader.

The fine particles of copper obtained by the method disclosed in Japanese Patent Laid-Open No. 2003-342621 have a mean particle diameter of 0.5 to 4.0 micrometers, and are not sufficient to be used as fine particles of copper for internal electrodes. In addition, in this method, cuprous oxide generated from bivalent copper ions are reduced to cupric oxide, and thereafter, cupric oxide thus obtained are further reduced to copper particles. The reduction of cupric oxide to copper particles is a so-called dissolving and depositing reaction. If this method is used for producing copper particles having a large particle diameter to some extent, the control of particle diameters can be stably carried out, and the particle size distribution can be sharp. However, in this method, it is difficult to obtain fine particles of copper for internal electrodes, and it is difficult to obtain fine particles which are separated from each other (the fine particles containing no intergrowth particles and no aggregation particles).

The fine particles of copper obtained by the method disclosed in Japanese Patent Laid-Open No. 2004-256857 have, as mean particle diameters, a primary particle diameter of 0.25 to 0.5 micrometers and a secondary particle diameter of 0.3 to 0.6 micrometers. It is considered that they can be used as a copper powder for internal electrodes judging from the mean particle diameters. In addition, the tap density of the copper powder is in the range of from 3.2 g/cm$^3$ to 3.4 g/cm$^3$ which is a high tap density as fine particles, so that it is considered that the dispersibility of the copper powder is excellent. However, since the reaction in the method disclosed in Japanese Patent Laid-Open No. 2004-256857 is allowed out in the presence of the sulfur compound, there is some possibility that the internal and surface of the fine particles of copper may contain the sulfur compound. Since sulfur generally has a bad influence on the reliability of electronic parts, it is not desired that a copper powder for conductive paste contains sulfur.

DISCLOSURE OF THE INVENTION

It is therefore an object of the present invention to eliminate such conventional problems and to provide a copper powder for conductive paste, which comprises monodisperse and spherical fine copper particles having a sharp particle size distribution and containing no coarse particles and which can form a thinner electrode film while avoiding a bad influence on electric characteristics thereof, and a method for stably producing such a copper powder for conductive paste.

In order to accomplish the aforementioned object, the inventors have diligently studied and found that it is possible to stably produce a copper powder for conductive paste, which comprises monodisperse and spherical fine copper particles having a sharp particle size distribution and containing no coarse particles and which can form a thinner electrode film while avoiding a bad influence on electric characteristics thereof, by a method comprising the steps of: complexing copper by adding a complexing agent to an aqueous solution containing copper while blowing air into the solution; stopping the blowing of air after the complexing of copper; and thereafter, adding a reducing agent to the solution to deposit copper particles by reduction. Thus, the inventors have made the present invention.

According to the present invention, there is provided a method for producing a copper powder for conductive paste, the method comprising the steps of: complexing copper by adding a complexing agent to an aqueous solution containing copper while blowing air into the solution; stopping the blowing of air after the complexing of copper; and thereafter, adding a reducing agent to the solution to deposit copper particles by reduction.

In this method for producing a copper powder for conductive paste, the complexing agent is preferably at least one complexing agent selected from the group consisting of ammonia, acetic acid, formic acid, gluconic acid, citric acid, trisodium citrate, sodium tartrate and disodium ethylenediaminetetraacetate. The reducing agent is preferably at least one reducing agent selected from the group consisting of hypophosphoric acid, sodium hypophosphite, hydrazine, sodium borohydride and formalin. The aqueous solution containing copper is preferably an aqueous solution containing cuprous oxide or copper oxide. The complexing of copper is preferably carried out for a period of time which is not shorter than 15 minutes. The equivalent weight of the complexing agent added to the aqueous solution containing copper is preferably in the range of from 0.035 to 0.065 with respect to that of copper contained in the aqueous solution containing copper. Preferably, the equivalent weight of the reducing agent added to the aqueous solution containing copper is not less than 3 with respect to that of copper contained in the aqueous solution containing copper.

According to the present invention, there is also provided a copper powder for conductive paste, wherein the 50% particle diameter ($D_{50}$) of the copper powder is in the range of from 0.1 to 0.5 micrometers and the maximum particle diameter ($D_{max}$) thereof is not greater than 1.5 micrometers if they are measured by a laser diffraction particle size distribution measuring apparatus, and wherein the BET specific surface area of the copper powder is not less than 3 m²/g if it is measured by a chemical adsorption method.

Moreover, according to the present invention, there is provided a conductive paste which contains the above-described copper powder for conductive paste, as a conductive powder.

According to the present invention, it is possible to stably produce a copper powder for conductive paste, which comprises monodisperse and spherical fine copper particles having a sharp particle size distribution and containing no coarse particles and which can form a thinner electrode film while avoiding a bad influence on electric characteristics thereof.

BEST MODE FOR CARRYING OUT THE INVENTION

Figure 1:
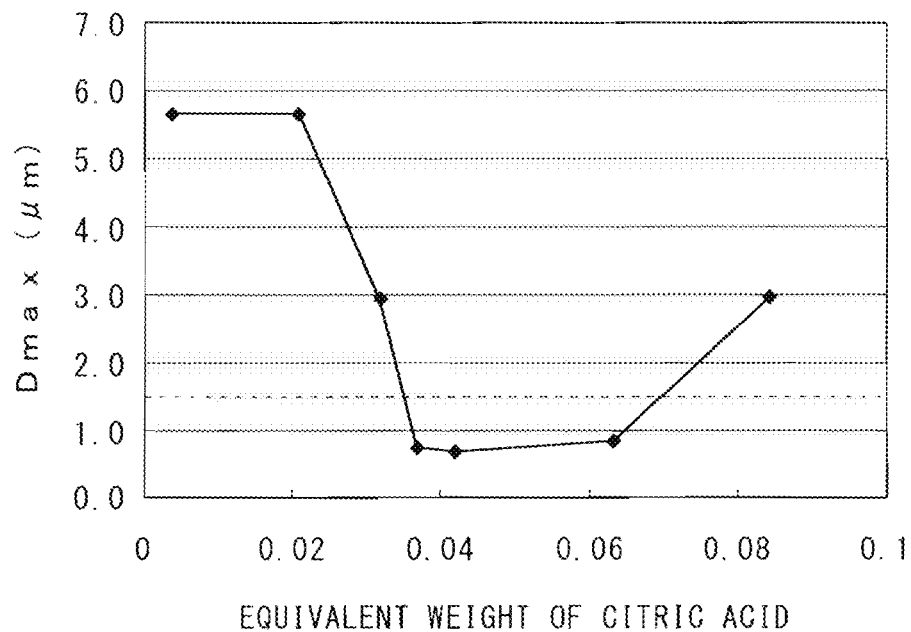
FIG. 1 is a graph showing the maximum particle diameter ($D_{max}$) of a copper powder with respect to the equivalent weight of citric acid introduced as a complexing agent in examples and comparative examples.

In the preferred embodiment of a method for producing a copper powder for conductive paste according to the present invention, after copper is complexed by adding a complexing agent to an aqueous solution containing copper while blowing air into the solution, the blowing of air is stopped, and then, a reducing agent is added to the solution to deposit copper particles by reduction.

In this method, after the complexing of copper is carried out while blowing air into the aqueous solution containing copper, the reducing agent is added to the aqueous solution containing the obtained complex of copper and/or complex ions of copper. Thus, the complex of copper and/or complex ions of copper are reduced directly to fine nuclei of copper to be allowed to grow while complex of copper and/or complex ions of copper are formed to suppress the reactivity of copper in the reaction solution, so that the agglomeration, aggregation and bonding of copper particles due to the sudden reaction of copper can be suppressed to obtain copper particles. By such a reaction process, it is possible to obtain highly-dispersed copper particles from inexpensive raw materials of copper, the agglomeration, aggregation and bonding of the copper particles being suppressed.

In a conventional typical method for producing a copper powder by a wet reaction, bivalent copper ions are neutralized to generate copper hydroxide, and temperature is adjusted to accelerate dehydration to generate copper oxide. There is also known a method for primary reducing copper oxide to cuprous oxide with a weak reducing agent, such as sugars, to secondary reduce the generated cuprous oxide to copper particles with a strong reducing agent, such as hydrazine. In the secondary reduction (reduction from cuprous oxide to copper) in this method, after copper ions are deposited from solid cuprous oxide, part thereof is reduced to generate fine nuclei of copper, and the nuclei grow to be copper particles.

In this case, two kinds of reactions are carried out, one of the reactions being allowed to dissolve copper ions from cuprous oxide, and the other of the reactions being allowed to reduce the dissolved copper ions to copper particles. For that reason, it is difficult to strictly separate a step of generating fine nuclei of copper from a step of allowing the nuclei to grow. As a result, secondary nuclei are generated to allow the particle size distribution to be broader, so that it is difficult to control the particle diameter of the copper particles. Since the amount of copper ions supplied at the initial stage of reduction is small (since the major part of copper exists in cuprous oxide, not in the reaction solution), it is difficult to generate a large number of nuclei, and it is difficult to obtain fine particles. In order to generate a large number of nuclei, even if the amount of dissolved copper ions can be increased by increasing the amount of the reducing agent to be added or by raising the reaction temperature, reduction is simultaneously accelerated. As a result, there are problems in that reduction and dissolution simultaneously occur to generate a large number of heteromorphic particles (particles distorted by the aggregation or bonding of the particles), and so forth. In addition, the reaction suddenly occurs to cause liquid spouting and/or bumping, so that the method is not desirable viewed from the safety and repeatability of reaction. Moreover, although an inert gas is generally fed into a reaction system to allow reduction in order to suppress the deactivation of a reducing agent, it is difficult to complex copper if an inert gas is fed into a reaction system for complexing copper.

For that reason, in the preferred embodiment of a method for producing a copper powder for conductive paste according to the present invention, after the complexing is preferably carried out at a temperature of about 30° C. for a period of time, which is not shorter than 15 minutes, while blowing air into a reaction solution, an inert gas is fed into the solution to carry out reduction. Thus, in a reaction system in which the obtained complex of copper and/or complex ions of copper exist, the reactivity of copper other than the complex of copper and complex ions of copper is suppressed, so that the agglomeration, aggregation and bonding of copper particles due to the sudden reaction of copper are suppressed.

The reason why copper is complexed to obtain the complex of copper and/or complex ions of copper is that the complex of copper and/or complex ions of copper are caused to exist in the reaction solution to suppress the reactivity of copper other than the complex of copper and complex ions of copper to suppress the agglomeration, aggregation and bonding of copper particles due to the sudden reaction of copper. In view of costs, availability and safety in handling, the aqueous solution containing copper serving as raw materials is preferably an aqueous solution containing at least one selected from the group consisting of copper chloride, copper sulfate, copper nitrate, copper carbonate, copper acetate, cuprous oxide and copper oxide, and more preferably a cuprous oxide containing slurry.

The complexing agent can be selected from various complexing agents capable of forming the complex of copper and/or complex ions of copper. In view of the effects of suppressing the amount of the complex of copper and/or complex ions of copper and suppressing the reactivity of copper in the reaction solution, the complexing agent is preferably at least one complexing agent selected from the group consisting of ammonia, acetic acid, formic acid, gluconic acid, citric acid, trisodium citrate, sodium tartrate and disodium ethylenediaminetetraacetate, and more preferably citric acid. If the amount of the complexing agent to be used is too small, the amount of the complex of copper and/or complex ions of copper is decreased to deteriorate the effects of suppressing the reactivity of copper in the reaction solution, so that it is difficult to synthesize fine particles of copper having such characteristics that they are monodisperse fine particles containing no coarse particles. On the other hand, if the amount of the complexing agent to be used is too large, the reactivity of copper in the reaction solution is too low, so that it is difficult to synthesize fine particles of copper having such characteristics that they are monodisperse fine particles containing no coarse particles. Therefore, the equivalent weight of the complexing agent is preferably larger than 0.32 and smaller than 0.84, more preferably in the range of from 0.035 to 0.065, with respect to the amount of substance of copper, assuming that 1 mol of the complexing agent corresponds to an equivalent weight of 1 with respect to 1 mol of Cu existing in the reaction solution.

The amount of air to be blown should not be limited if it is possible to form the complex of copper and/or complex ions of copper in the reaction solution. If the amount of air to be blown is too small, it is not possible to sufficiently form the complex of copper and/or complex ions of copper, so that the number of fine nuclei of copper to be generated is decreased to deteriorate the effects of suppressing the reactivity of copper in the reaction solution. Therefore, it is difficult to synthesize fine particles of copper having such characteristics that they are monodisperse fine particles containing no coarse particles.

If the amount of the reducing agent to be added for reducing the complex of copper and/or complex ions of copper to copper is too small, the reduction rate is too slow, so that it is difficult to synthesize fine particles of copper having such characteristics that they are monodisperse fine particles containing no coarse particles. Therefore, the equivalent weight of the reducing agent to be added is preferably 3 or more, assuming that the equivalent weight of the reducing agent required to reduce copper of monovalent cuprous oxide is 1.

As the method for stirring the reaction solution during the reduction, any method capable of uniformly mixing the reaction solution can be used. For example, there are a method for stirring the solution by means of a magnet stirrer, and a method for placing a stirring bar having blades in the reaction solution to rotate the bar by an external motor to stir the solution.

The reaction temperature during the reduction may be in the range of from 20° C. to 100° C., and preferably in the range of from 60° C. to 95° C. in view of the controllability of the reaction.

The reducing agent can be selected from various reducing agent. The reducing agent is preferably at least one reducing agent selected from the group consisting of hypophosphoric acid, sodium hypophosphite, hydrazine, sodium borohydride and formalin, and more preferably hydrazine.

The copper powder containing slurry thus obtained is filtered and washed with water to obtain a massive copper cake. The filtering and water washing method may be any one of: a method for water-washing the powder while fixing it by means of a filter press or the like; a method for decanting the slurry, removing a supernatant liquid from the slurry, adding pure water to the slurry to stir it, and thereafter, decanting the slurry again to repeatedly remove a supernatant liquid; and a method for repulping the copper powder after filtering, and thereafter, repeating filtering again. However, there is preferably used a method capable of removing a larger amount of impurities locally remaining in the copper powder. Thus, it is considered that there are the effects of preventing agglomeration during drying and the effects of enhancing the degree of activity of functional groups existing on the surface of the copper powder to enhance the rate of adhesion of fatty acids, surface treating agents or the like to the copper powder. Thereafter, a substance having the effect of corrosion prevention, such as a fatty acid and benzoazole, may be dissolved in a lower alcohol or the like to be passed through the washed copper cake or to be used for repulping the washed copper cake, to coat the copper cake with the substance. Alternatively, the moisture in the copper cake may be replaced with a lower alcohol in order to advance the drying of the copper cake. It is possible to obtain fine particles of copper by drying the obtained copper cake in a non-oxidizing atmosphere (drying in an atmosphere of nitrogen or drying in a vacuum). If necessary, dry crushing, screening, air classification or the like may be carried out.

The copper powder for conductive paste, which is produced by the above-described preferred embodiment of a method for producing a copper powder for conductive paste according to the present invention, comprises monodisperse and fine particles having a sharp particle size distribution and containing no coarse particles, and is suitably used as a copper powder for conductive paste for forming internal and external electrodes of multilayer ceramic capacitors and so forth. This copper powder for conductive paste can be used for producing a conductive paste by a known method. The conductive paste thus produced can be used for forming a thinner electrode film while avoiding a bad influence on electric characteristics thereof, and can be used for forming internal and external electrodes of multilayer ceramic capacitors and so forth.

The copper powder for conductive paste, which is produced by the preferred embodiment of a method for producing a copper powder for conductive paste according to the present invention, has a 50% particle diameter ($D_{50}$), which is in the range of from 0.1 to 0.5 micrometers, and a detected maximum particle diameter ($D_{max}$), which is not greater than 1.5 micrometers, if they are measured by a laser diffraction particle size distribution measuring apparatus. If the 50% particle diameter ($D_{50}$) of the copper powder is in the range of from 0.1 to 0.5 micrometers when it is measured by the laser diffraction particle size distribution measuring apparatus, it is possible to provide a thinner internal electrode film (a thickness of 1.5 micrometers or less in recent years) which is required to increase the capacity of multilayer ceramic capacitors or the like and to decrease the size thereof. If the detected maximum particle diameter ($D_{max}$) of the copper powder is not greater than 1.5 micrometers, it is possible to prevent coarse particles existing in the thinner internal electrode film from breaking the dielectric materials of dielectric ceramic green sheets to cause insulating failure when the internal electrode is laminated on the dielectric ceramic green sheets.

Moreover, the copper powder for conductive paste, which is produced by the preferred embodiment of a method for producing a copper powder for conductive paste according to the present invention, has a BET specific surface area which is not less than 3 m²/g, preferably not less than 4 m²/g, if it is measured by a chemical adsorption method. If the BET specific surface area of the copper powder is not less than 3 m²/g when it is measured by the chemical adsorption method, the copper powder can comprise monodisperse and fine particles of copper containing no coarse particles. On the other hand, if the BET specific surface area of the copper powder is less than 3 m²/g when it is measured by the chemical adsorption method, there is some possibility that the copper powder may contain coarse particles which are not suitably used as a copper powder for use in a conductive paste for forming an internal electrode or the like.

Examples of a copper powder for conductive paste and a method for producing the same according to the present invention will be described below in detail.

EXAMPLE 1

After 3800 g of pure water was placed in a 5 L of reaction vessel, air was blown into the reaction vessel at a flow rate of 0.5 L/min from the bottom thereof, and a stirring bar arranged in the reaction vessel was rotated. Then, 5.33 g (equivalent weight of 0.042) of citric acid (produced by FUSO CHEMICAL CO., LTD.) was introduced to the reaction vessel, and 43.17 g of cuprous oxide (NC-301 produced by NISSIN CHEMCO Co., Ltd., mean particle diameter of 2.5 micrometers) was introduced to the reaction vessel to allow a reaction at 30° C., for 2 hours to carry out a complexing treatment. Thereafter, the supply of air was stopped, and nitrogen gas was fed into the reaction vessel at a flow rate of 2.0 L/min from the top thereof. Then, the temperature in the reaction vessel was raised to 90° C., and 40.2 g (equivalent weight of 8.54) of hydrazine hydrate (80% hydrazine hydrate produced by Otsuka Chemical Co., Ltd.) was introduced to the reaction vessel to allow a reduction to be held for 1 hour. Thereafter, stirring was stopped, and washing and drying were carried out to obtain copper particles.

EXAMPLE 2

Fine particles of copper were obtained by the same method as that in Example 1, except that the amount of the introduced citric acid was 4.70 g (equivalent weight of 0.037).

EXAMPLE 3

Fine particles of copper were obtained by the same method as that in Example 1, except that the amount of the introduced citric acid was 8.00 g (equivalent weight of 0.063).

EXAMPLE 4

Fine particles of copper were obtained by the same method as that in Example 1, except that the amount of the introduced hydrazine hydrate was 15.08 g (equivalent weight of 3.20).

EXAMPLE 5

Fine particles of copper were obtained by the same method as that in Example 1, except that the amount of the introduced hydrazine hydrate was 20.10 g (equivalent weight of 4.27).

EXAMPLE 6

Fine particles of copper were obtained by the same method as that in Example 1, except that the amount of the introduced hydrazine hydrate was 22.62 g (equivalent weight of 4.81).

EXAMPLE 7

Fine particles of copper were obtained by the same method as that in Example 1, except that the amount of the introduced hydrazine hydrate was 27.66 g (equivalent weight of 5.88).

EXAMPLE 8

Fine particles of copper were obtained by the same method as that in Example 1, except that the amount of the introduced hydrazine hydrate was 30.17 g (equivalent weight of 6.41).

EXAMPLE 9

Fine particles of copper were obtained by the same method as that in Example 1, except that the amount of the introduced hydrazine hydrate was 60.30 g (equivalent weight of 12.81).

EXAMPLE 10

Fine particles of copper were obtained by the same method as that in Example 1, except that the amount of the introduced hydrazine hydrate was 90.45 g (equivalent weight of 19.22).

EXAMPLE 11

Fine particles of copper were obtained by the same method as that in Example 1, except that the reaction was allowed at 30° C. for 15 minutes for carrying out the complexing treatment.

EXAMPLE 12

Fine particles of copper were obtained by the same method as that in Example 1, except that the reaction was allowed at 30° C. for 30 minutes for carrying out the complexing treatment.

EXAMPLE 13

Fine particles of copper were obtained by the same method as that in Example 1, except that the reaction was allowed at 30° C. for 6 hours for carrying out the complexing treatment.

EXAMPLE 14

Fine particles of copper were obtained by the same method as that in Example 1, except that the reaction was allowed at 30° C. for 12 hours for carrying out the complexing treatment.

EXAMPLE 15

Fine particles of copper were obtained by the same method as that in Example 1, except that the reaction was allowed at 30° C. for 24 hours for carrying out the complexing treatment.

EXAMPLE 16

Fine particles of copper were obtained by the same method as that in Example 1, except that the reaction was allowed at 30° C. for 38 hours for carrying out the complexing treatment.

COMPARATIVE EXAMPLE 1

In an atmosphere of nitrogen, an aqueous solution of copper sulfate, which was obtained by dissolving 0.6925 kg of pentahydrate of copper sulfate ($CuSO_4.5H_2O$) in 2.20 kg of pure water and which was held at 29° C., was added to an aqueous alkali solution, which was obtained by dissolving 0.578 kg of an aqueous NaOH solution having a concentration of 48.3% in 4.12 kg of pure water and which was held at 27° C., to be strongly stirred. Then, the temperature of the aqueous solution of copper sulfate and aqueous alkali solution was raised to 34° C. by heat generation to obtain a suspension in which copper hydroxide was deposited. The pH of the suspension was 13.74. The aqueous solution of copper sulfate and the aqueous alkali solution were so mixed that the equivalent ratio of sodium hydrate to copper in the solution was 1.25. To the suspension of copper hydroxide thus obtained, a glucose solution obtained by dissolving 0.9935 g of glucose in 1.41 kg of pure water was added. Thus, the temperature of the suspension was raised to 70° C. in 30 minutes, and then, the suspension was allowed to stand for 15 minutes.

Then, air was blown into the suspension at a flow rate of 0.7 L/min for 200 minutes to be bubbled. The pH of the suspension thus bubbled was 6.2. After the suspension was allowed to stand in an atmosphere of nitrogen for two days, a supernatant liquid (pH 6.92) was removed from the suspension to substantially recover the total amount of precipitate. Then, 0.7 kg of pure water was added to the precipitate to obtain a suspension. To the suspension thus obtained, 0.065 kg (equivalent weight of 2.1) of hydrazine hydrate was added. Then, the temperature of the suspension was raised to 50° C. by a heat generating reaction, and the temperature thereof was finally raised to 80° C., so that the reaction was completed. The solid-liquid separation of the suspension after the completion of the reaction was carried out to recover a copper powder. The copper powder thus recovered was dried at 120° C. in an atmosphere of nitrogen to obtain a granulated copper powder.

COMPARATIVE EXAMPLE 2

Fine particles of copper were obtained by the same method as that in Example 1, except that the amount of the introduced citric acid was 0.51 g (equivalent weight of 0.004).

COMPARATIVE EXAMPLE 3

Fine particles of copper were obtained by the same method as that in Example 1, except that the amount of the introduced citric acid was 2.67 g (equivalent weight of 0.021).

COMPARATIVE EXAMPLE 4

Fine particles of copper were obtained by the same method as that in Example 1, except that the amount of the introduced citric acid was 4.06 g (equivalent weight of 0.032).

COMPARATIVE EXAMPLE 5

Fine particles of copper were obtained by the same method as that in Example 1, except that the amount of the introduced citric acid was 10.66 g (equivalent weight of 0.084).

COMPARATIVE EXAMPLE 6

Fine particles of copper were obtained by the same method as that in Example 1, except that the amount of the introduced hydrazine hydrate was 10.05 g (equivalent weight of 2.14).

COMPARATIVE EXAMPLE 7

Fine particles of copper were obtained by the same method as that in Example 1, except that the reaction was allowed without blowing air into the reaction vessel (the complexing time was zero).

COMPARATIVE EXAMPLE 8

Fine particles of copper were obtained by the same method as that in Example 1, except that nitrogen gas was substituted for air when the complexing treatment was carried out.

The equivalent weight of citric acid introduced as the complexing agent, the equivalent of hydrazine hydrate introduced as the reducing agent, and the complexing time in each of these examples and comparative examples are shown in Table 1.

TABLE 1

|  | Equivalent Weight of Citric Acid | Equivalent Weight of Hydrazine | Complexing Time (hr) |
| --- | --- | --- | --- |
| Ex. 1 | 0.042 | 8.54 | 2 |
| Ex. 2 | 0.037 | 8.54 | 2 |
| Ex. 3 | 0.063 | 8.54 | 2 |
| Ex. 4 | 0.042 | 3.20 | 2 |
| Ex. 5 | 0.042 | 4.27 | 2 |
| Ex. 6 | 0.042 | 4.81 | 2 |
| Ex. 7 | 0.042 | 5.88 | 2 |
| Ex. 8 | 0.042 | 6.41 | 2 |
| Ex. 9 | 0.042 | 12.81 | 2 |
| Ex. 10 | 0.042 | 19.22 | 2 |
| Ex. 11 | 0.042 | 8.54 | 0.25 |
| Ex. 12 | 0.042 | 8.54 | 0.5 |
| Ex. 13 | 0.042 | 8.54 | 6 |
| Ex. 14 | 0.042 | 8.54 | 12 |
| Ex. 15 | 0.042 | 8.54 | 24 |
| Ex. 16 | 0.042 | 8.54 | 38 |
| Comp. 1 | — | 2.1 | — |
| Comp. 2 | 0.004 | 8.54 | 2 |
| Comp. 3 | 0.021 | 8.54 | 2 |
| Comp. 4 | 0.032 | 8.54 | 2 |
| Comp. 5 | 0.084 | 8.54 | 2 |
| Comp. 6 | 0.042 | 2.14 | 2 |
| Comp. 7 | 0.042 | 8.54 | 0 |
| Comp. 8 | 0.042 | 8.54 | — |

The particle size distribution, 50% particle diameter ($D_{50}$) and $D_{max}$ (the detected maximum particle diameter) of the copper powder obtained in each of the examples and comparative examples were measured by a laser diffraction particle size distribution measuring apparatus (LS-230 produced by Beckman Coulter, Inc.). Furthermore, the copper powder obtained in each of the examples and comparative examples, together with pure water, was placed in a beaker to be sufficiently dispersed by an ultrasonic dispersing vessel or the like, and the liquid thus obtained was used as a measurement sample. As an optical model, the real part of the index of refraction of the liquid was set to be 1.322 with respect to a laser and PIDS (Polarization Intensity Differential Scattering) at 450 nm, 600 nm and 900 nm, and the real part of the index of refraction of the sample was set to be 1.5 with respect to a laser and PIDS at 450 nm, 600 nm and 900 nm, the imaginary part of the index of refraction of the sample being set to be 0 with respect to a laser, 10 with respect to PIDS at 450 nm, and 0.3 with respect to PIDS at 600 nm and 900 nm.

Figure 2:
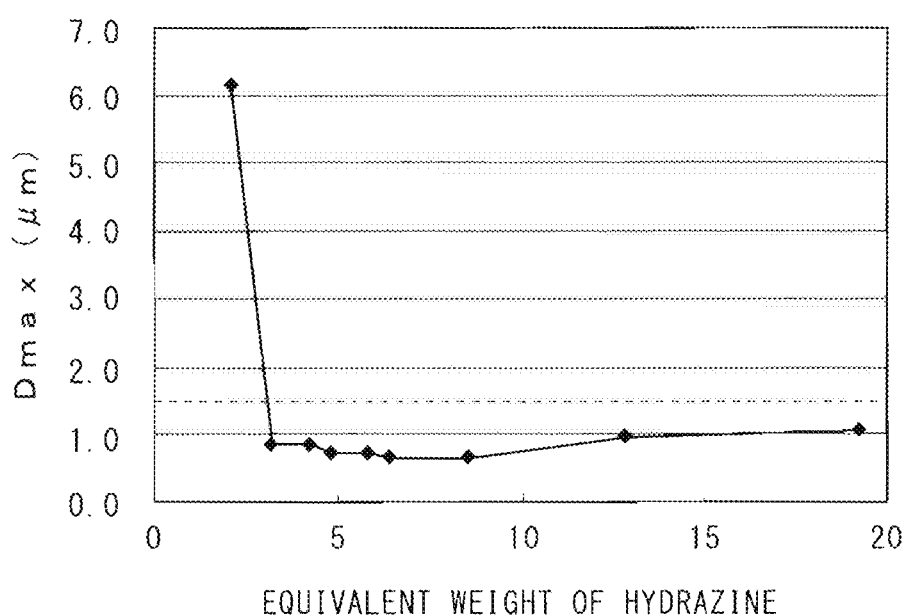
FIG. 2 is a graph showing the maximum particle diameter ($D_{max}$) of a copper powder with respect to the equivalent weight of hydrazine hydrate introduced as a reducing agent in examples and comparative examples.
Figure 3:
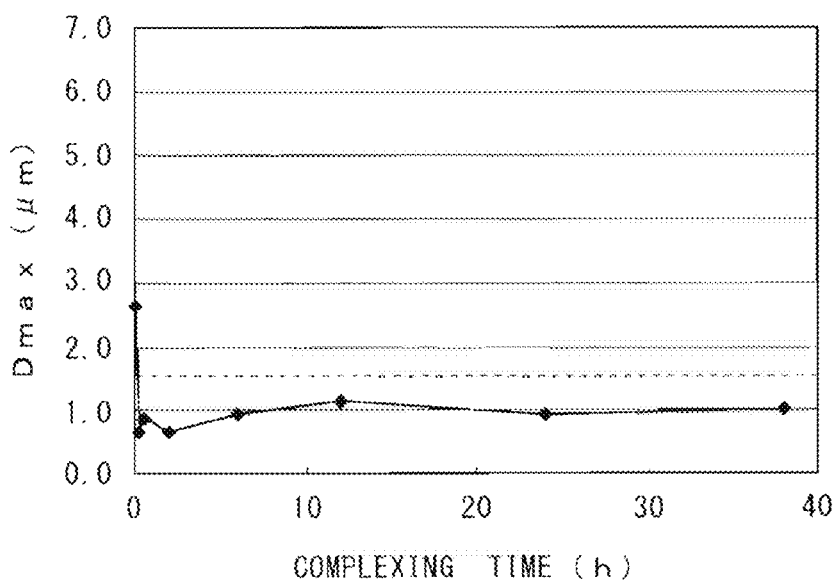
FIG. 3 is a graph showing the maximum particle diameter ($D_{max}$) of a copper powder with respect to the complexing time in examples and comparative examples.
Figure 4:
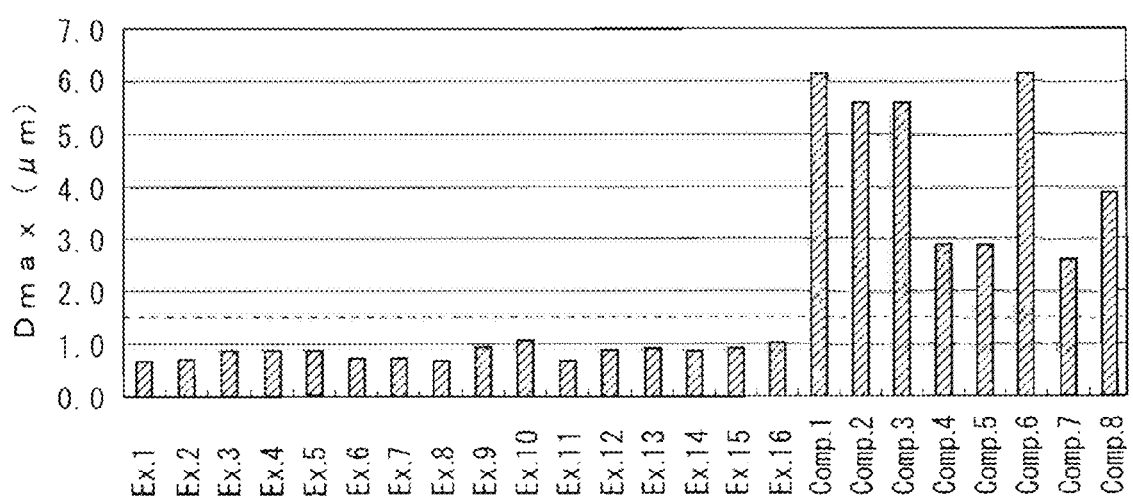
FIG. 4 is a graph showing the maximum particle diameter ($D_{max}$) of a copper powder obtained in examples and comparative examples.

These results are shown in Table 2. The detected maximum particle diameter ($D_{max}$) with respect to the equivalent weight of citric acid introduced as the complexing agent, the equivalent weight of hydrazine hydrate introduced as the reducing agent, and the complexing time are shown in FIGS. 1-3, respectively, and the detected maximum particle diameter ($D_{max}$) of the copper powder obtained in each of the examples and comparative examples is shown in FIG. 4.

TABLE 2

| | Particle Size Distribution (μm) | | | | | | |
|---|---|---|---|---|---|---|---|
| | D10 | D25 | D50 | D75 | D90 | Coef. of Variation | Dmax |
| Ex. 1 | 0.249 | 0.308 | 0.374 | 0.438 | 0.493 | 24.6 | 0.657 |
| Ex. 2 | 0.265 | 0.326 | 0.396 | 0.464 | 0.525 | 24.6 | 0.721 |
| Ex. 3 | 0.199 | 0.270 | 0.365 | 0.499 | 0.627 | 41.0 | 0.869 |
| Ex. 4 | 0.251 | 0.319 | 0.400 | 0.483 | 0.556 | 28.6 | 0.869 |
| Ex. 5 | 0.172 | 0.241 | 0.302 | 0.361 | 0.427 | 36.3 | 0.869 |
| Ex. 6 | 0.287 | 0.344 | 0.410 | 0.475 | 0.533 | 22.7 | 0.721 |
| Ex. 7 | 0.268 | 0.327 | 0.396 | 0.462 | 0.523 | 24.1 | 0.721 |
| Ex. 8 | 0.251 | 0.310 | 0.376 | 0.440 | 0.493 | 24.4 | 0.657 |
| Ex. 9 | 0.198 | 0.269 | 0.359 | 0.483 | 0.612 | 40.3 | 0.953 |
| Ex. 10 | 0.214 | 0.282 | 0.357 | 0.429 | 0.494 | 33.3 | 1.047 |
| Ex. 11 | 0.255 | 0.313 | 0.379 | 0.442 | 0.495 | 24.1 | 0.657 |
| Ex. 12 | 0.178 | 0.243 | 0.307 | 0.381 | 0.554 | 41.9 | 0.869 |
| Ex. 13 | 0.224 | 0.291 | 0.365 | 0.439 | 0.517 | 36.8 | 0.953 |
| Ex. 14 | 0.207 | 0.282 | 0.370 | 0.486 | 0.590 | 36.9 | 0.869 |
| Ex. 15 | 0.204 | 0.277 | 0.373 | 0.494 | 0.613 | 39.3 | 0.953 |
| Ex. 16 | 0.216 | 0.284 | 0.364 | 0.454 | 0.588 | 39.9 | 1.047 |
| Comp. 1 | 2.522 | 2.878 | 3.380 | 3.977 | 4.558 | 22.2 | 6.158 |
| Comp. 2 | 0.532 | 0.902 | 1.320 | 1.769 | 2.188 | 49.4 | 5.611 |
| Comp. 3 | 0.261 | 0.370 | 0.571 | 1.028 | 2.275 | 101.0 | 5.611 |
| Comp. 4 | 0.262 | 0.347 | 0.473 | 0.705 | 1.522 | 75.6 | 2.920 |
| Comp. 5 | 0.245 | 0.334 | 0.479 | 0.727 | 1.315 | 73.5 | 2.920 |
| Comp. 6 | 0.229 | 0.343 | 0.581 | 2.307 | 3.408 | 102.3 | 6.158 |
| Comp. 7 | 0.241 | 0.380 | 0.782 | 1.184 | 1.478 | 57.7 | 2.660 |
| Comp. 8 | 0.239 | 0.324 | 0.461 | 0.704 | 1.473 | 83.3 | 3.862 |

The form of particle and mean particle diameter of the copper powder obtained in each of the examples and comparative examples were evaluated by a field emission scanning electron microscope (SEM) (S-4700 type produced by Hitachi, Ltd.). Furthermore, the mean particle diameter of free particles of copper (free particle diameter) observed by SEM was calculated from the 50% Heywood diameter of 200 particles. The field of view in photograph of 20,000 magnifications was used for calculating the particle diameter. If the number of 200 particles could not be measured, the number of the particle diameters of all of the free particles of copper in the field of view were calculated.

The specific surface area of the copper powder obtained in each of the examples and comparative examples was derived by the BET method using a BET specific surface area measuring apparatus (4SORB-US produced by Yuasa Ionics Co., Ltd.), and the BET particle diameter of the copper powder was calculated from the derived specific surface area assuming that the density of free particles of copper was 8.9 g/cm².

Figure 5:
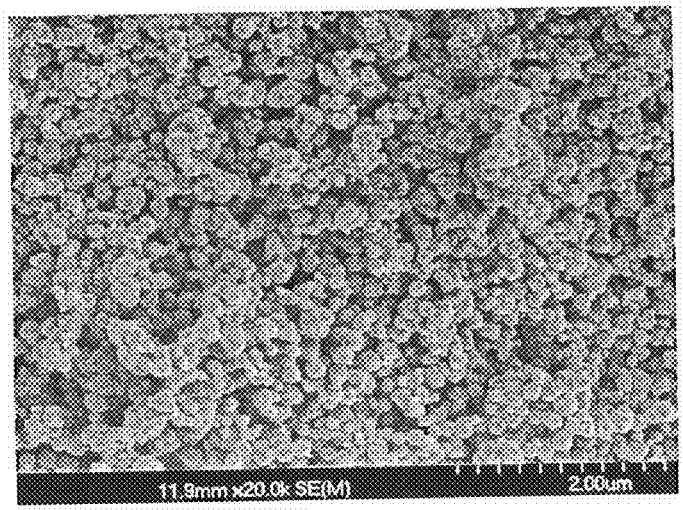
FIG. 5 is a scanning electron microscope (SEM) photograph (×20,000) of a copper powder obtained in Example 1.
Figure 6:
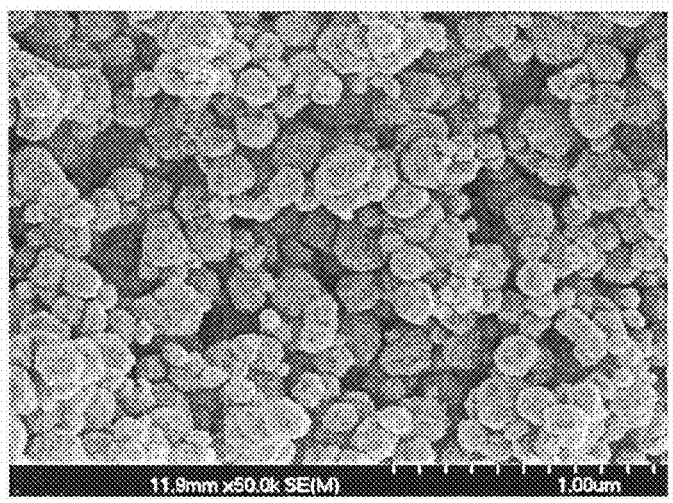
FIG. 6 is a SEM photograph (×50,000) of a copper powder obtained in Example 1.
Figure 7:
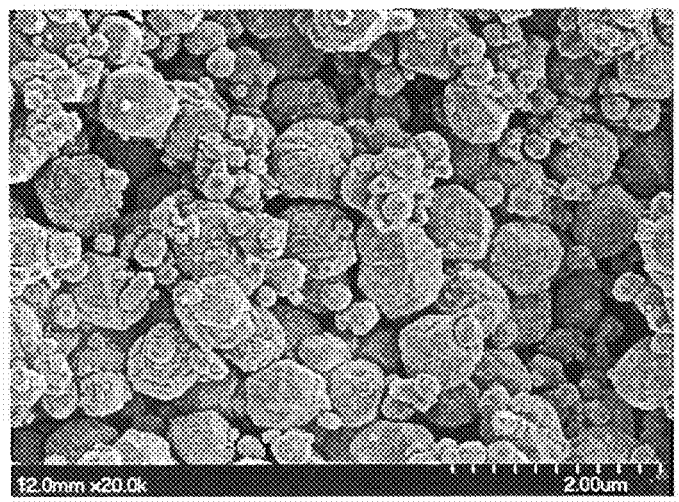
FIG. 7 is a SEM photograph (×20,000) of a copper powder obtained in Comparative Example 7.
Figure 8:
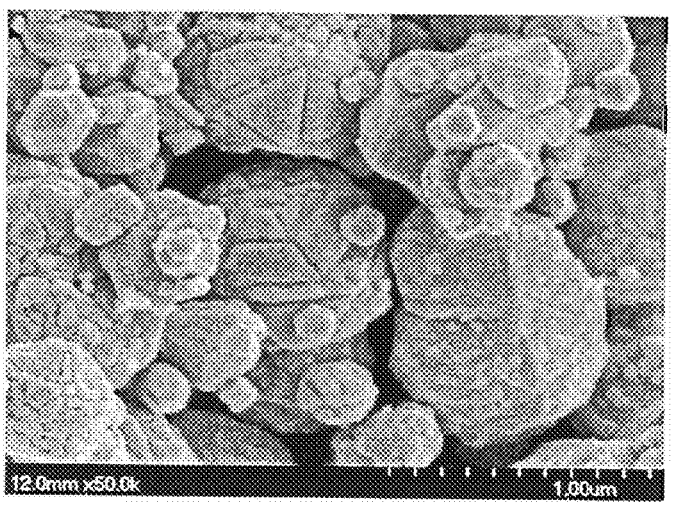
FIG. 8 is a SEM photograph (×50,000) of a copper powder obtained in Comparative Example 7.
Figure 9:
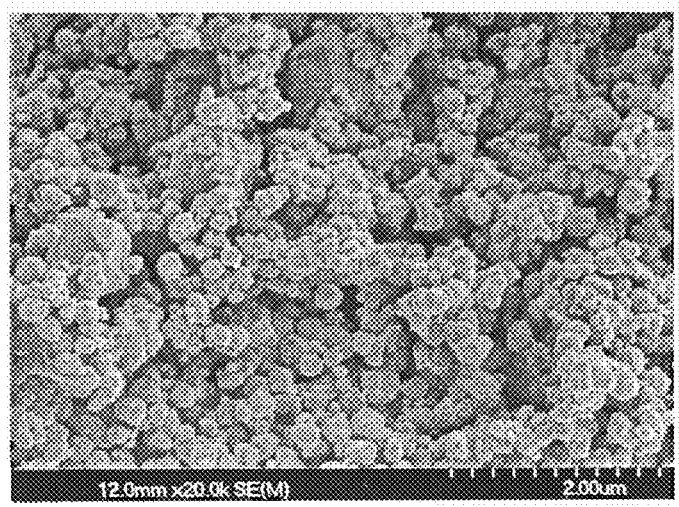
FIG. 9 is a SEM photograph (×20,000) of a copper powder obtained in Comparative Example 8.
Figure 10:
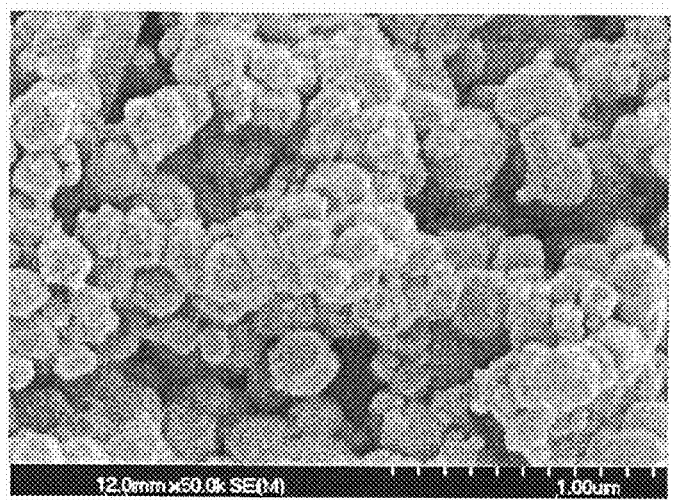
FIG. 10 is a SEM photograph (×50,000) of a copper powder obtained in Comparative Example 8.

These results are shown in Table 3. The SEM photographs of the copper powder obtained in Example 1 are shown in FIGS. 5 and 6. The SEM photographs of the copper powder obtained in Comparative Example 7 are shown in FIGS. 7 and 8, and the SEM photographs of the copper powder obtained in Comparative Example 8 are shown in FIGS. 9 and 10.

TABLE 3

| | SEM Mean Particle Diameter (μm) | BET Particle Diameter (μm) | BET (m²/g) | $(D_{90} - D_{10})/D_{50}$ |
|---|---|---|---|---|
| Ex. 1 | 0.17 | 0.12 | 5.428 | 0.652 |
| Ex. 2 | 0.26 | 0.17 | 4.075 | 0.657 |
| Ex. 3 | 0.22 | 0.15 | 4.571 | 1.173 |
| Ex. 4 | 0.24 | 0.20 | 3.449 | 0.763 |
| Ex. 5 | 0.21 | 0.16 | 4.338 | 0.844 |
| Ex. 6 | 0.27 | 0.20 | 3.445 | 0.600 |
| Ex. 7 | 0.25 | 0.18 | 3.844 | 0.644 |
| Ex. 8 | 0.20 | 0.14 | 4.793 | 0.644 |
| Ex. 9 | 0.22 | 0.15 | 4.493 | 1.153 |
| Ex. 10 | 0.20 | 0.14 | 4.841 | 0.784 |
| Ex. 11 | 0.22 | 0.16 | 4.312 | 0.633 |
| Ex. 12 | 0.20 | 0.14 | 4.981 | 1.225 |
| Ex. 13 | 0.18 | 0.12 | 5.716 | 0.803 |
| Ex. 14 | 0.18 | 0.13 | 5.216 | 1.035 |
| Ex. 15 | 0.21 | 0.15 | 4.417 | 1.097 |
| Ex. 16 | 0.19 | 0.15 | 4.560 | 1.022 |
| Comp. 1 | — | 1.93 | 0.350 | 0.602 |
| Comp. 2 | 0.56 | 0.42 | 1.617 | 1.255 |
| Comp. 3 | 0.35 | 0.61 | 1.106 | 3.527 |
| Comp. 4 | 0.20 | 0.15 | 4.594 | 2.664 |
| Comp. 5 | 0.23 | 0.31 | 2.185 | 2.234 |
| Comp. 6 | Uncompleted reaction | 0.37 | 1.844 | 5.472 |
| Comp. 7 | 0.62 | 0.33 | 2.018 | 1.582 |
| Comp. 8 | 0.79 | 0.21 | 3.244 | 2.677 |

As can be seen from the results of Tables 1-3 and FIGS. 1-4, if the reduction is carried out after the complexing treatment is carried out by feeding the complexing agent and air to the solution of raw materials as Examples 1-16, the difference in particle size distribution (($D_{90}$–$D_{10}$)/$D_{50}$) between particles having approximating particle diameters is in the range of from 0.600 to 1.173, which is smaller than the range of from 1.255 to 5.472, so that it is possible to stably produce fine particles of copper having such characteristic that they are monodisperse and fine particles containing no coarse particles (having a very small maximum particle diameter of 1.5 micrometers or less).

Furthermore, if Examples 1-3 wherein the amount of the introduced citric acid is in the range of from 4.70 to 8.00 g (the equivalent weight of 0.037 to 0.063) are compared with Comparative Examples 2-5 wherein the amount of the introduced citric acid is in the range of from 0.51 to 4.06 g and 10.66 g (the equivalent weight of 0.004 to 0.032 and 0.084), it can be seen that the maximum particle diameter of the copper powder is very small if the amount of the introduced citric acid is in the range in Examples 1-3. If Examples 1 and 4-10 wherein the amount of the introduced hydrazine hydrate is in the range of 15.08 to 90.45 g (the equivalent weight of 3.20 to 19.2) are compared with Comparative Example 6 wherein the amount of the introduced hydrazine hydrate is 10.05 g (the equivalent weight of 2.14), it can be seen that the maximum particle diameter of the copper powder is very small if the amount of the introduced hydrazine hydrate increases. If Examples 1 and 11-16 wherein the complexing time is in the range of from 15 minutes to 38 hours are compared with Comparative Example 7 wherein the complexing time is zero, it can be seen that the maximum particle diameter of the copper powder is very small if the complexing time is not less than 15 minutes. Moreover, if Example 1 wherein air is blown into the reaction vessel is compared with Comparative Example 8 wherein nitrogen gas is blown into the reaction vessel, it can be seen that the maximum particle diameter of the copper powder is very small if air is blown into the reaction vessel.

The invention claimed is:
1. A method for producing a copper powder for conductive paste, the method comprising the steps of:

complexing copper by adding a complexing agent to an aqueous solution containing cuprous oxide or cupric oxide while blowing air into the solution;

stopping the blowing of air after complexing copper; and thereafter, adding a reducing agent to the solution to deposit copper particles by reduction.

2. A method for producing a copper powder for conductive paste as set forth in claim 1, wherein said complexing agent is at least one complexing agent selected from the group consisting of ammonia, acetic acid, formic acid, gluconic acid, citric acid, trisodium citrate, sodium tartrate and disodium ethylenediaminetetraacetate.

3. A method for producing a copper powder for conductive paste as set forth in claim 1, wherein said reducing agent is at least one reducing agent selected from the group consisting of hypophosphoric acid, sodium hypophosphite, hydrazine, sodium borohydride and formalin.

4. A method for producing a copper powder for conductive paste as set forth in claim 1, wherein the complexing of copper is carried out for a period of time which is not shorter than 15 minutes.

5. A method for producing a copper powder for conductive paste as set forth in claim 1, wherein the equivalent weight of the complexing agent added to the aqueous solution containing copper is in the range of from 0.035 to 0.065 with respect to that of copper contained in the aqueous solution containing copper.

6. A method for producing a copper powder for conductive paste as set forth in claim 1, wherein the equivalent weight of the reducing agent added to the aqueous solution containing copper is not less than 3 with respect to that of copper contained in the aqueous solution containing copper.

\* \* \* \* \*